(12) United States Patent
Kusano et al.

(10) Patent No.: US 6,386,710 B2
(45) Date of Patent: *May 14, 2002

(54) PROJECTION DISPLAY APPARATUS

(75) Inventors: Masaaki Kusano, Kawasaki; Yuji Manabe, Kamakura; Atsushi Sekine, Kasukabe, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/750,309

(22) Filed: Dec. 29, 2000

Related U.S. Application Data (63) Continuation of application No. 09/259,284, filed on Mar. 1, 1999, now Pat. No. 6,190,014.

(30) Foreign Application Priority Data

Mar. 2, 1998 (JP) .......................................... 10-066200

(51) Int. Cl.⁷ .............................................. G03B 21/14
(52) U.S. Cl. ........................................ 353/81; 359/831
(58) Field of Search .............................. 353/81, 31, 33, 353/122; 359/496, 831

(56) References Cited

U.S. PATENT DOCUMENTS

| | | | | |
|---|---|---|---|---|
| 4,392,722 A | * | 7/1983 | Shirasaki | |
| 4,627,688 A | * | 12/1986 | Kobayashi et al. | |
| 4,834,854 A | * | 5/1989 | Sugihara et al. | 204/182.8 |
| 5,374,968 A | * | 12/1994 | Haven et al. | 353/31 |
| 5,798,819 A | * | 8/1998 | Hattori et al. | 353/33 |
| 5,826,959 A | * | 10/1998 | Atsuchi | 353/20 |
| 5,967,635 A | * | 10/1999 | Tani et al. | 353/20 |
| 6,028,703 A | * | 2/2000 | Sekine et al. | 359/487 |

FOREIGN PATENT DOCUMENTS

| | | |
|---|---|---|
| JP | 61-13885 | 1/1986 |
| JP | 63-39294 | 2/1988 |
| JP | 2599309 | 1/1997 |

* cited by examiner

*Primary Examiner*—William Dowling
(74) *Attorney, Agent, or Firm*—Miles & Stockbridge P.C.

(57) ABSTRACT

A projection display apparatus comprises a modulator, an analyzer, and projecting optical system. The modulator includes two-dimensionally arrayed pixel units and it modulates an incident light and emits the modulated light. The analyzer analyzes the emitted light from the modulator. The projection optical system projects the analyzed light from the analyzer. The analyzer includes a polarized beam splitter having a pair of prisms and an adhesive layer held between the pair of prisms. The difference in thickness between thin and thick portions of the adhesive layer is set equal to a predetermined value or less, based on a pixel pitch of the modulator.

14 Claims, 7 Drawing Sheets

PROJECTION DISPLAY APPARATUS

CROSS-REFERENCE TO RELATED APPLICATIONS

This application is a continuation of application Ser. No. 09/259,284 filed Mar. 1, 1999, now U.S. Pat. No. 6,190,014.

This application also claims the benefit of Japanese Application No. 10-066200 which is hereby incorporated by reference.

BACKGROUND OF THE INVENTION

1. Field of the Invention

The present invention relates to a projection display apparatus having a polarized beam splitter for receiving a light from a light valve and analyzing a modulated light. More specifically, the present invention relates to an improvement on the polarized beam splitter.

2. Description of the Related Art

In Published Japanese Patent Registration No. 2599309, disclosed is a color projection display apparatus for separating a light from a light source into respective color lights of R, G and B by a color-separation optical system, making incident each of the color lights on a polarized beam splitter to be polarized and separated, making incident one of lights obtained by polarizing and separating a color light on a reflection light valve arranged for each color light to be modulated, making incident emitted reflected lights including the modulated lights on the polarized beam splitter, analyzing the same and thereby extracting the modulated lights, composing such analyzed modulated lights with one another by a composing optical system and then projecting the composed light by a projection optical system.

Figure 7:
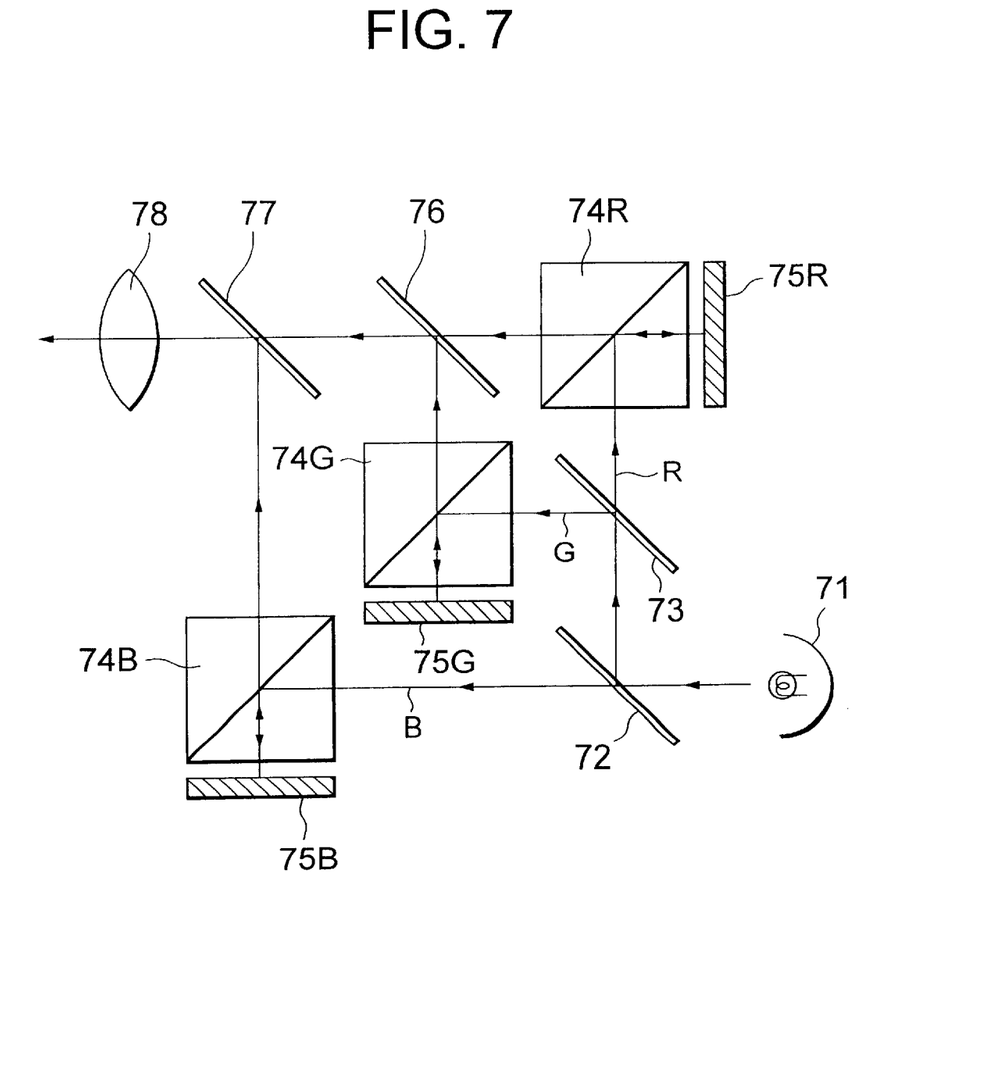
FIG. 7 is a view showing a projection display apparatus of a conventional example.

In FIG. 7, shown is a structure of the projection display apparatus disclosed in the Published Japanese Patent Registration No. 2599309.

Specifically, a light emitted from a light source 71 is made incident on a dichroic mirror 72 arranged as a "color-separation optical system" on an optical axis. Then, the light is subjected to a color-separation into a B light to be transmitted and R and G lights to be reflected according to a dichroic characteristic of the mirror 72. The transmitted B light is made incident on a polarized beam splitter 74B for the B light as a "polarization and separation optical system". An S polarized light of the B light reflected by a polarizing and separating section of the polarized beam splitter 74B is made incident on a reflection light valve 75B.

On the other hand, a mixed light of the reflected R and G lights is made incident on a dichroic mirror 73 arranged as a "color-separation optical system" on the optical axis in parallel with the dichroic mirror 72. Then, the mixed light is subjected to a color-separation into a G light to be reflected and an R light to be transmitted according to a dichroic characteristic of the mirror 73.

The G light obtained by the color-separation is made incident on a polarized beam splitter 74G as a "polarization and separation optical system". An S polarized light reflected by a polarizing and separating section of the polarized beam splitter 74G is made incident on a light valve 75G for the G light. Likewise, the R light is made incident on a polarized beam splitter 74R as a "polarization and separation optical system". Then, an S polarized light reflected by a polarizing and separating section of the polarized beam splitter 74R is made incident on a light valve 75R for the R light.

The S polarized lights respectively made incident on the light valves 75B, 75G and 75R are modulated by signals applied to the same, reflected and emitted as lights including modulated and unmodulated lights. These lights are then made incident on the polarized beam splitters 74B, 74G and 74R for the respective colors, and subjected to an analysis by the polarizing and separating sections of the polarized beam splitters 74B, 74G and 74R. Only the modulated lights are extracted as P polarized lights transmitted through the polarized beam splitters 74B, 74G and 74R, and the analyzed lights are color-composed by a dichroic mirror 76 and a dichroic mirror 77 arranged as a "composing optical system". Then, a result of the color composing is projected to a projection lens 78 as a "projection optical system".

In the projection display apparatus disclosed in the foregoing Published Patent Gazette, as described above, the dichroic mirrors 76 and 77 are used as the composing optical system. Another apparatus has also been disclosed, where a cross dichroic prism is used as "composing optical system".

The inventors of the present invention have investigated a significant problem inherent in the foregoing conventional projection display apparatus, which is constructed in a manner that the reflection light valves 75B, 75G and 75R are arranged for the respective colors, modulated lights among lights reflected by the light valves 75B, 75G and 75R are analyzed by the polarized beam splitters 74B, 74G and 74R arranged for the respective colors and then the analyzed lights are color-composed. Specifically, for an image projected on a screen by the projection optical system (projection lens 78), it was impossible to make registration adjustment (pixel positioning) coincident among the colors. Consequently, pixel deviation occurred.

Usually, with reference to the pixel positioning, relative to projected images from one of the light valves 75B, 75G and 75R for specified color lights, pixel deviation of specified positions of the other light valves 75B, 75G and 75R for the other colors must be limited to ½ pixel or lower, preferably within ⅓ pixel on full surfaces of the projected images.

A level of pixel deviation which is not a problem at all for the conventional light valves 75B, 75G and 75R, each of these having a pixel size of about 40 $\mu$m, becomes a severe problem for a light valve having a very small pixel size of about 10 $\mu$m.

Further, as a projected image is increased in size to be displayed on a large screen, the foregoing problem of pixel deviation will become more severe.

The inventors found as a result of extensive investigation that the problem of pixel deviation is not a problem that is created after execution of a vibration test or an environmental test such as a temperature cycle for the projection display apparatus. Rather, this is a basic problem which is created at the time of assembling the constituent members of the projection display apparatus. The inventors found a characteristic of the problem is that although an original shape of the display section of the light valve is rectangular, the display section is deformed to be a parallelogram, and consequently, pixel deviation occurs in a projected light from the light valve for a specified color light.

Furthermore, the inventors investigated projected images by replacing, among the constituent members of the projection display apparatus, the members for the respective light colors. When an experiment was made by replacing the polarized beam splitter with another for the other color light and arranging the same, a projected image of another color light was also projected in a parallelogram of the same size. Therefore, it was discovered that the projection of the image in the parallelogram rather than in the original rectangular shape can be attributed to the polarized beam splitter.

SUMMARY OF THE INVENTION

It is an object of the present invention to provide a projection display apparatus capable of reducing distortion of a projected light.

It is another object of the invention to provide a projection display apparatus for enabling registration of pixels of a plurality of light valves.

The present invention provides a projection display apparatus which comprises: a modulator including two-dimensionally arrayed pixel units for modulating an incident light and emitting the modulated light; an analyzer for analyzing the emitted light from the modulator; and a projection optical system for projecting the analyzed light from the analyzer. The analyzer includes a polarized beam splitter having a pair of prisms and an adhesive layer held between the pair of prisms. A difference in thickness between thin and thick portions of the adhesive layer is set equal to a predetermined value or lower based on a pixel pitch of the modulator.

According to the projection apparatus constructed in the foregoing manner, since a difference in thickness between the thin and thick portions of the adhesive layer is set equal to a specified value or lower based on the pixel pitch of the modulator, an occurrence of pixel deviation after passing through the polarized beam splitter can be prevented corresponding to an accuracy of the pixel pitch, and thus distortion of a projected image can be easily eliminated. Moreover, in the case of the projection display apparatus using the plurality of light valves, accurate pixel registration can be made for each light valve.

In accordance with a preferred aspect of the present invention, if a refractive index of the pair of prisms is $n_1$, a refractive index of the adhesive layer is $n_2$, a difference in thickness between the thin and thick portions of the adhesive layer is D and a pixel pitch is P, a value $\Delta X$ is determined by the following expression $$\Delta X = D \left( \frac{n_1}{2 \cdot \sqrt{n_2^2 - 0.5 \cdot n_1^2}} - \frac{1}{\sqrt{2}} \right)$$

and satisfies a following relationship:

$\Delta X < (\frac{1}{2})P$

With the projection display apparatus constructed in the foregoing manner, an occurrence of pixel deviation after passing through the polarized beam splitter can be prevented more effectively.

In accordance with a first aspect of the present invention, provided is a projection display apparatus which comprises: a light valve for modulating an incident light and emitting the modulated light; a polarized beam splitter for receiving a light emitted from the light valve and analyzing a modulated light as a light to be transmitted; and a projection optical system for projecting an analyzed light which has been transmitted through and emitted from the polarized beam splitter, wherein the polarized beam splitter has a structure where an adhesive layer exhibiting a refractive index $n_2$ is held between two glass prisms, each of which exhibits a refractive index $n_1$, and if a difference in thickness between thin and thick portions of the adhesive layer is D and a pixel pitch of the light valve is P, a value $\Delta X$ satisfies a relationship of $\Delta X < (\frac{1}{2})P$, the value $\Delta X$ being determined by the following expression:

$$\Delta X = D \left( \frac{n_1}{2 \cdot \sqrt{n_2^2 - 0.5 \cdot n_1^2}} - \frac{1}{\sqrt{2}} \right)$$

In accordance with a second aspect of the present invention, provided is a projection display apparatus which comprises: a light source; a color-separation optical system for color-separating a light emitted from the light source into R, G and B lights; polarization and separation optical systems arranged for respective color lights obtained by the color-separation of the color-separation optical system, each polarization and separation optical system performing a polarization and separation for a corresponding color light; light valves for the respective color lights, each of which has incident thereon a corresponding one of the polarized lights obtained by the polarization and separation of the corresponding polarization and separation optical system, modulates the corresponding color light, reflects and emits the modulated light; analyzing optical systems for the respective color lights, each of which has incident thereon a corresponding color light emitted from the corresponding light valve and analyzes the modulated light; a composing optical system for color-composing lights analyzed by the analyzing optical systems; and a projection optical system for projecting a light obtained by composing of the composing optical system, wherein the polarization and separation optical systems and the analyzing optical systems are polarized beam splitters arranged for the respective color lights, a polarized light reflected by each of the polarized beam splitters is made incident on the corresponding light valve, and among lights emitted from the light valves, a polarized light to be transmitted is used, and wherein each of the polarized beam splitters has a structure where an adhesive layer exhibiting a refractive index $n_2$ is held between two glass prisms, each of which has a refractive index $n_1$, and if a difference in thickness between thin and thick portions of the adhesive layer is D and a pixel pitch of the light valve is P, a value $\Delta X$ satisfies a relationship of $\Delta X < (\frac{1}{2})P$, the value $\Delta X$ being determined by the following expression:

$$\Delta X = D \left( \frac{n_1}{2 \cdot \sqrt{n_2^2 - 0.5 \cdot n_1^2}} - \frac{1}{\sqrt{2}} \right)$$

In accordance with a third aspect of the present invention, provided is a projection display apparatus which comprises: a light source; a polarization and separation optical system for polarizing and separating a light emitted from the light source; a color-separation optical system for color-separating one polarized light obtained by polarization and separation of the polarization and separation optical system in the foregoing polarization and separation optical system into R, G and B lights; light valves arranged for respective color lights, each of which makes incident each color light obtained by separation of the color-separation optical system, modulates the same based on a color signal and then emits the modulated light; a composing optical system for color-composing color lights emitted from the light valves; an analyzing optical system for extracting only a modulated light from a composed light obtained by the composing optical system; and a projection lens for projecting a light analyzed by the analyzing optical system, wherein the polarization and separation optical system and the analyzing optical system are polarized beam splitters arranged for respective color lights, a polarized light reflected by each of the polarized beam splitters is made incident on the corresponding light valve, and among lights emitted from the light valves, a polarized light to be transmitted is used as an analyzed light, and wherein each of the polarized beam splitters has a structure where an adhesive layer having a refractive index $n_2$ is held between two glass prisms, each of which has a refractive index $n_1$, and if a difference in thickness between thin and thick portions of the adhesive layer is D and a pixel pitch of the light valve is P, a value $\Delta X$ satisfies a relationship of $\Delta X<(\frac{1}{2})P$, the value $\Delta X$ being determined by the following expression:

$$\Delta X = D\left(\frac{n_1}{2 \cdot \sqrt{n_2^2 - 0.5 \cdot n_1^2}} - \frac{1}{\sqrt{2}}\right)$$

BRIEF DESCRIPTION OF THE DRAWINGS

For a more complete understanding of the present invention and the advantages thereof, reference is now made to the following description taken in conjunction with the accompanying drawings.

DESCRIPTION OF THE PREFERRED EMBODIMENTS

First Embodiment

Figure 1:
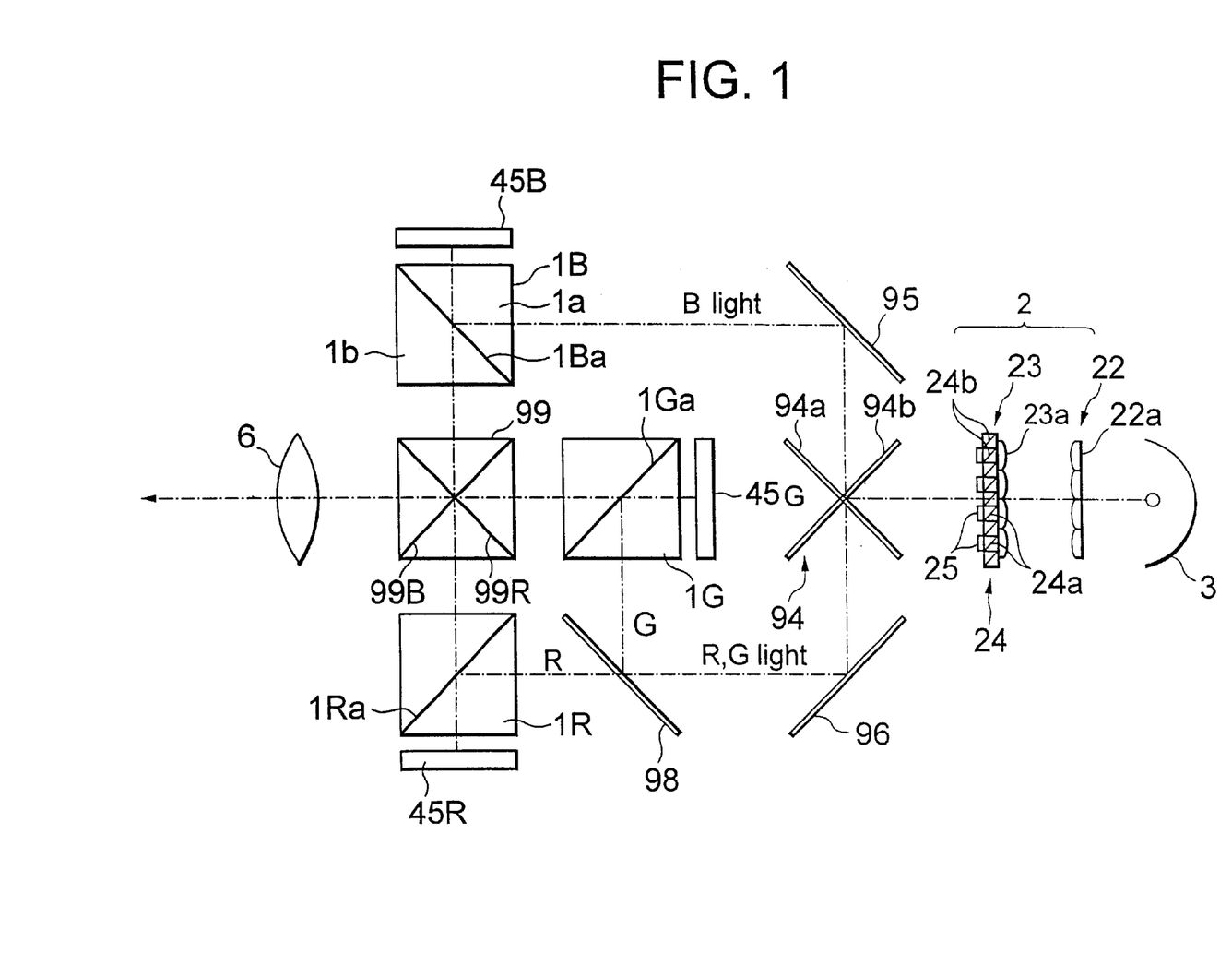
FIG. 1 is a view illustrating a structure of a projection display apparatus of a first embodiment of the present invention.

FIG. 1 is a view for explaining a structure of a projection display apparatus of a first embodiment. In this projection display apparatus, lights emitted from a light source 3 are roughly parallel light beams and random-polarized, passed through a polarization converter 2 and then converted into S polarized lights.

The parallel light beams made incident on the polarization converter 2 are first made incident on a first lens plate 22 having a plurality of lens elements 22a arrayed in a matrix form (e.g., 4×5), and then each of the parallel light beams is divided into a number corresponding to the number of lens elements 22a based on apertures determined by an outer shape of each of the lens elements 22a. The outer shapes of the lens elements 22a of the first lens plate 22 are identical to one another, and similar to shapes of light valves 45R, 45G and 45B (described later) which are objects to be illuminated.

In a focal position of each lens element 22a of the first lens plate 22, arranged is a second lens plate 23 which includes lens elements 23a arrayed in positions corresponding to those of the lens elements 22a. Because of the foregoing arrangements of the first and second lens plates 22 and 23, the parallel light beams made incident on the respective lens elements 22a of the first lens plate 22 are converged on a center part of the lens elements 23a of the second lens plate 23. Then, a luminescent point is formed on the lens elements 23a.

A light emitted from the luminescent point of the lens element 23a of the second lens plate 23 is made incident on a polarized beam splitter prism array 24 which is arranged in the vicinity of a light exit surface of the second lens plate 23. This polarized beam splitter prism array 24 includes polarized beam splitters 24a and 24b, each of which has a width equal to ½ of a width of the lens element 23a of the second lens plate 23. In this embodiment, one polarized beam splitter 24a is arranged in a place facing a center side of each of the lens elements 23a, and the other polarized beam splitter 24b is arranged in a place facing a boundary side of each of the lens elements 23a. Accordingly, the light emitted from the luminescent point on the lens element 23a is polarized and separated into P and S polarized lights: the P polarized light being made incident on the polarized beam splitter 24a and passed through a polarizing and separating section of the same; and the S polarized light being reflected on the polarizing and separating section, made incident on the adjacent polarized beam splitter 24b, reflected on a polarizing and separating section of the same and then emitted. The P polarized light passed through the polarized beam splitter 24a is then converted into an S polarized light by a ½ wavelength phase plate 25 arranged on a light exit surface of the polarized beam splitter 24a. As a result, all the lights from the light source 3 are converted into S polarized lights by being passed through the polarization converter 2.

Each light from the light source converted into an S polarized light by the polarization converter 2 is then made incident on a cross dichroic mirror 94 which includes a dichroic mirror 94a having a B light reflection characteristic and a dichroic mirror 94b having R and G light reflection characteristics, the dichroic mirrors 94a and 94b being arranged in X-shape. Here, the light is color-separated into a B light component which advances in a direction perpendicular to an incident optical axis, and a mixed light between G and R light components which advance in a direction opposite the direction of the B light.

The B light obtained as a result of the foregoing color-separation by the cross dichroic mirror 94 advances to enter a bending mirror 95, further advances after changing an optical axis by a right angle and then enters a polarized beam splitter 1B for the B light. The mixed light of the G and R lights obtained by the color-separation advances after changing an optical axis by a right angle by a bending mirror 96, and then enters a G light reflection dichroic mirror 98 arranged on the optical axis. The mixed light is then color-separated into an R light component which is directly transmitted, and a G light component which is reflected and advances after changing an optical axis by a right angle. The R and G lights obtained as a result of the color-separation by the dichroic mirror 98 are respectively made incident on polarized beam splitters 1R and 1G.

The cross dichroic mirror 94, the bending mirrors 95 and 96 and the G light reflection dichroic mirror 98 constitute a color-separation optical system.

Polarizing and separating sections of the polarized beam splitters 1B, 1G and 1R are arranged to reflect incident S polarized lights of respective colors. Accordingly, incident B, G and R lights are respectively reflected by the polarizing and separating sections 1B*a*, 1G*a* and 1R*a* of the polarized beam splitters 1B, 1G and 1R, and then emitted from the polarized beam splitters 1B, 1G and 1R. In the vicinity of the light exit surfaces thereof, arranged are reflection light valves 45B, 45G and 45R for respective color lights. The S polarized lights of respective colors made incident on the light valves 45B, 45G and 45R are reflected and emitted as mixed lights of modulated light (P polarized light) and unmodulated light (S polarized light).

The modulated and unmodulated lights from the light valves 45B, 45G and 45R are respectively made incident on the polarized beam splitters 1B, 1G and 1R again. The polarized beam splitters 1B, 1G and 1R analyze lights transmitted through the polarizing and separating sections 1B*a*, 1G*a* and 1R*a* as modulated lights (P polarized lights). The analyzed lights of respective colors are made incident from different incident surfaces on a cross dichroic prism 99 of a color composing optical system. Then, the color composition is completed by a B light reflection dichroic layer 99B and an R light reflection dichroic layer 99R which are arranged in an X-shape inside the cross dichroic prism 99. As a result, a composed light of the B, G and R lights is emitted from a light exit surface of the cross dichroic prism 99. The composed light emitted from the cross dichroic prism 99 is then made incident on a projection lens 6, and then projected as a full-color image on a not-shown screen.

Figure 2:
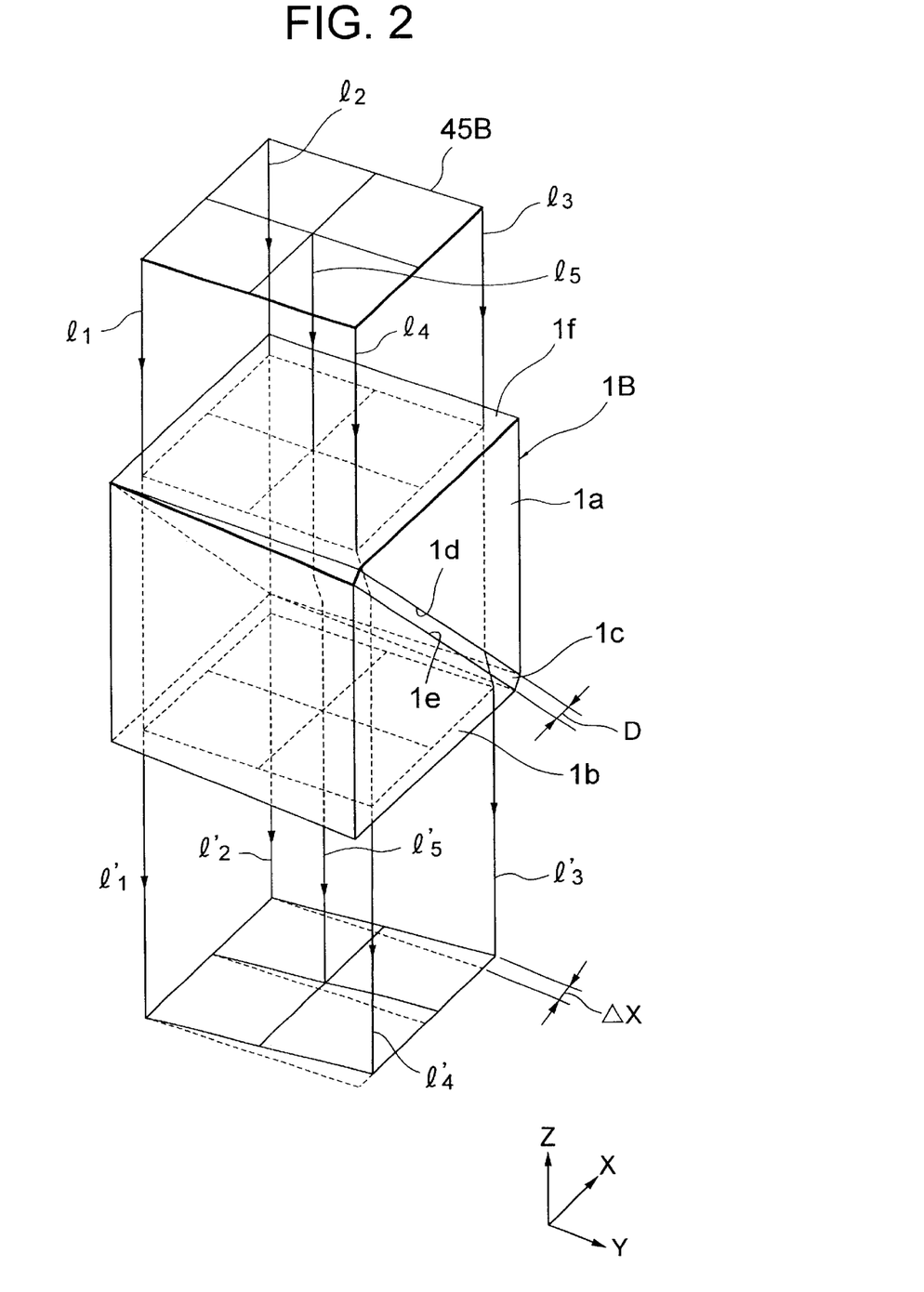
FIG. 2 is a view illustrating an occurrence of distortion when an image from a light valve is transmitted through a polarized beam splitter of the present invention.

Referring to FIG. 2, a method to prevent a projected image from being a parallelogram in the projection display apparatus of FIG. 1 will be described.

In the projection display apparatus shown in FIG. 1, the polarized beam splitters 1B, 1G and 1R are respectively arranged for B, G and R lights. In FIG. 2, the polarized beam splitter 1B is shown as a representative of the polarized beam splitters. For easy description of directions, X, Y and Z axes orthogonal to one another are defined as shown. Further, since the projection lens 6 of the projection display apparatus is set telecentric with respect to the light valve 45B side, principal rays $l_1$ to $l_5$ are parallel between the light valve and the polarized beam splitter 1B.

Deformation of the projected image to be a parallelogram can be understood when the polarized beam splitter 1B is constituted as follows. Specifically, as shown in FIG. 2, a polarized beam splitter 1B is manufactured in such manner that right-angled isosceles triangle optical prisms 1*a* and 1*b* having refractive indexes $n_1$ are prepared, and a polarizing and separating film 1*d* (or 1*e*) is formed on a bottom surface facing one right angle (apex angle) thereof, followed by adhering or cementing the optical prisms 1*a* and 1*b* to each other using adhesive. In this case, it is difficult to set a thickness of an adhesive layer 1*c* to be uniform on the full surface. Thus, the adhesive layer 1*c* is, as shown in the drawing, formed to be wedge-shaped having more thickness toward a Y-direction. The polarizing and separating surface is a plane parallel to a (101) plane if defined by using the foregoing coordinates.

Next, five light rays $l_1$ to $l_5$ (referred to as $l_1$, $l_2$, $l_3$, $l_4$ and $l_5$, hereinafter) reflected and emitted from four corners and an approximately central part of a display surface of the reflection light valve 45B will be described. The light rays $l_1$ to $l_5$ are vertically incident onto an upper plane 1*f* (parallel to XY plane) of the polarized beam splitter 1B, transmitted through the upper plane 1*f*, directly moved ahead, and then emitted from the prism 1*a* and made incident on the adhesive layer 1*c* having a refractive index $n_2$ in accordance with Snell's law (law of refraction). The light rays $l_1$ and $l_2$ are passed through thin places of the adhesive layer 1*c*. Thus, these light rays $l_1$ and $l_2$ advance with little deviation and become light rays and $l_1'$ and $l_2'$. The light rays $l_3$ and $l_4$ are likewise made incident vertically to the upper plane 1*f* of the polarized beam splitter 1B and directly moved ahead. The light rays $l_3$ and $l_4$ advance through the prism 1*a* to enter the adhesive layer 1*c*. But this light incident portion of the adhesive layer 1*c* has a largest thickness and thus causes a positional shift of ΔX in an X-direction. The shifting occurs with the light rays $l_3$ and $l_4$, and light rays $l_3'$ and $l_4'$ parallel to the light rays $l_3$ and $l_4$ are emitted. The light ray $l_5$ emitted from the approximately central part of the light valve 45B is likewise made incident to the upper plane 1*f* of the polarized beam splitter 1B, and moved ahead through the prism 1*a*. As an incident portion of the adhesive layer 1*c* for the light ray $l_5$ has a thickness of ½ of that of the incident portion for the light rays $l_3$ and $l_4$, the light ray $l_5$ is shifted in the X-direction by an amount of (ΔX·½) to enter the prism 1*b*. A shifted light ray advances in parallel with the light ray $l_5$, and then exits as a light ray $l_5'$.

FIG. 2 is a qualitative view illustrating deviation and emission of a light ray emitted from a display section of the light valve 45B in parallel with a -Z direction when the light ray is transmitted through the polarized beam splitter 1B. In FIG. 2, a dotted line indicates a position corresponding to the display section of the light valve 45B (position of a light ray when the ray is not passing through the polarized beam splitter 1B). A solid line indicates a position of the light ray after having passed through the polarized beam splitter 1B. Accordingly, it can be understood qualitatively that no changes occur in a length in the Y-direction, but the light ray having passed through the thickest portion of the adhesive layer 1*c* is deformed to be a parallelogram, which is a result of ΔX deviation made in the X-direction in proportion to the thickness of the adhesive layer 1*c*.

Therefore, it can be understood that since the adhesive layer 1*c* is formed to be wedge-shaped without having uniform thickness as shown in FIG. 2, a projected image is distorted to be a parallelogram.

Figure 3:
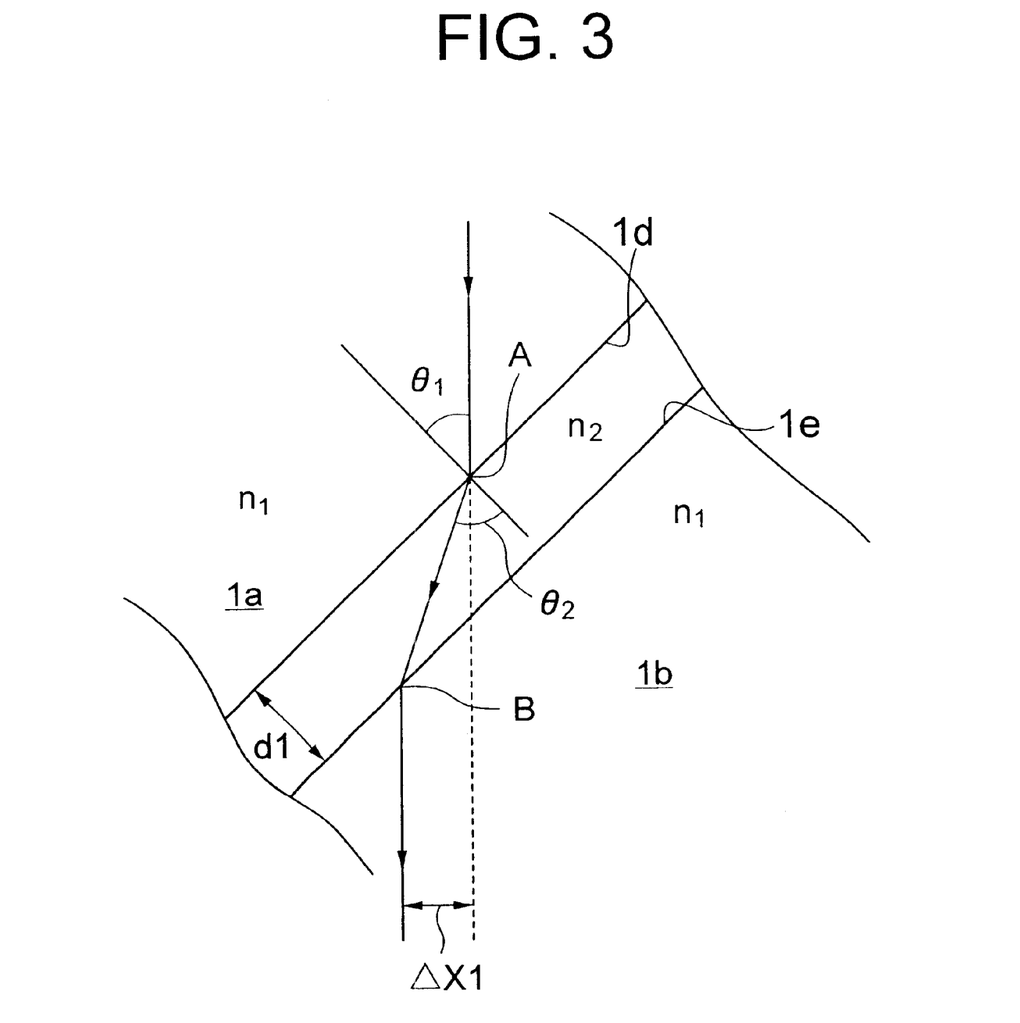
FIG. 3 is a view illustrating a state of a light beam passed through an adhesive layer of the polarized beam splitter.

Referring to FIG. 3, illustrated is a state of a light ray made incident on the prisms 1*a* and 1*b* and the adhesive layer 1*c* of the polarized beam splitter 1B when viewed from the Y-direction of FIG. 2.

It is now assumed that a light ray has been made incident from an object (prism 1*a*) having a refractive index $n_1$ on a position A of an object (adhesive layer 1*c*) having a thickness $d_1$ and a refractive index $n_2$ (usually $n_1 > n_2$) by an incident angle $\theta_1$.

In accordance with Snell's law, the following relationship is established with a refractive angle $\theta_2$:

$$n_1 \times \sin(\theta_1) = n_2 \times \sin(\theta_2) \tag{1}$$

The light ray having advanced through the adhesive layer 1*c* with the refractive angle $\theta_2$ is emitted from the adhesive layer 1*c* in a position B, refracted with the angle $\theta_1$, and then emitted into the prism 1*b*.

A length AB from the position A to the position B is expressed as follows:

$$AB = d_1 / \cos(\theta_2) \tag{2}$$

An amount of deviation ΔX1 of the light ray is expressed as follows:

$$\Delta X1 = AB \times \sin(\theta_2 - \theta_1) \tag{3}$$

For the light rays $l_1$ to $l_5$ of FIG. 2, the foregoing $\theta_1$ may be set to 45°.

By setting $\theta_1$ to 45° in the foregoing expressions (1) to (3), the amount of deviation $\Delta X1$ can be expressed as follows:

$$\Delta X1 = d_1 \left( \frac{n_1}{2 \cdot \sqrt{n_2^2 - 0.5 \cdot n_1^2}} - \frac{1}{\sqrt{2}} \right) \quad (4)$$

For the light rays $l_3$ and $l_4$ of the polarized beam splitter 1B shown in FIG. 2, if a thickest portion of the wedge shape of the adhesive layer 1c is D, a maximum deviation amount $\Delta X$ in this case is expressed as follows:

$$\Delta X = D \left( \frac{n_1}{2 \cdot \sqrt{n_2^2 - 0.5 \cdot n_1^2}} - \frac{1}{\sqrt{2}} \right) \quad (5)$$

If a pixel pitch of the light valve 45B is p in the X-direction, the foregoing deviation amount $\Delta X$ should be set to be (½)×p or less, preferably to be (⅓)×p or less. With these values of the deviation amount, no problems will occur in a projected image.

In the projection display apparatus of the embodiment, the polarized beam splitter 1B is manufactured with a precision for satisfying the expression (5). In this case, although a projected image may be slightly distorted to be a parallelogram, the distortion is about ½ pixel at the maximum. Accordingly, a precision necessary for image processing can be achieved.

The embodiment has been described by using the adhesive layer 1c which is changed in thickness in the Y-direction. But the present invention is not limited to this. For example, the invention can be applied to an adhesive layer which is changed in thickness in the X-direction.

It was described above with reference to FIG. 2 that almost no wedge or gap exits in the adhesive layer 1c for the light rays $l_1$ and $l_2$. In most actual cases, however, a portion of the adhesive layer 1c to be adhered has a limited thickness, and portions of the adhesive layer 1c for the light rays $l_3$ and $l_4$ are thicker.

In such a case, it is only necessary to determine a difference in thickness between the thickest and thinnest portions of the adhesive layer 1c. This is because the light rays $l_1$ to $l_5$ take shapes where all the solid lines indicating the amounts of deviation in FIG. 2 have been moved in parallel by amounts equal to the foregoing minimum thickness in the X-direction, and the parallel movements can be adjusted by registration adjustment of the light valve 45B.

Only the polarized beam splitter 1B has been described. The same thing can be said for the other polarized beam splitters 1G and 1R. In other words, if each of these splitters is manufactured with a precision for satisfying the foregoing expression (5), distortion of a projected image will be only ½ pixel at the maximum, and thus an image which satisfies a precision for image processing will be obtained.

The projection display apparatus has a structure where a light from the light source is color-separated into B, G and R lights by the color-separation optical system, and the polarized beam splitters 1B, 1G and 1R are arranged for the respective color lights. Polarization and separation are performed by the polarized beam splitters 1B, 1G and 1R, and lights emitted from the respective color light valves 45B, 45G and 45R are also analyzed by the splitters 1B, 1G and 1R. Especially, the lights made incident from the light valves 45B, 45G and 45R on the polarized beam splitters 1B, 1G and 1R are analyzed as polarized lights to be transmitted. The analyzed lights of respective colors are color-composed, and then projected by the projection lens 6.

In this case, as described above, since the lights emitted from the light valves 45B, 45G and 45R for the respective color lights are analyzed as polarized lights to be transmitted by the polarized beam splitters 1B, 1G and 1R for the respective color lights, registration can be enabled among the light valves 45B, 45G and 45R for the respective color lights, and also distortion of a projected image can be reduced.

Next, specific examples of the present invention will be described.

FIRST EXAMPLE

If a refractive index $n_1$ of each of the prisms 1a and 1b as the constituent elements of the polarized beam splitters 1B, 1G and 1R is 1.84 and a refractive index $n_2$ of the adhesive layer 1c is 1.42, then the following is established:

$\Delta X = 0.91 D$

Accordingly, (½)P>$\Delta X$(=0.91D) should be set. More preferably, (⅓)p>$\Delta X$(=0.91D) should be set.

If a pixel pitch p of each of the light valves 45B, 45G and 45R is 40 μm, a difference between a maximum thickness and a minimum thickness of the wedge shape of the adhesive layer 1c should be limited to about 22 μm or lower (preferably, 15 μm).

If a pixel pitch p of each of the light valves 45B, 45G and 45R is a small pixel pitch of 10 μm, then ¼ of the foregoing value is necessary for the thickness difference of the wedge shape of the adhesive layer 1c. Accordingly, the difference should be set equal to 5.5 μm or lower (preferably, 4 μm or lower).

SECOND EXAMPLE

If a refractive index $n_1$ of each of the prisms 1a and 1b as the constituent elements of the polarized beam splitters 1B, 1G and 1R is 1.84 as in the case of the preceding example and a refractive index $n_2$ of the adhesive layer 1c is 1.57, which is larger than that of the preceding example, then the following is established:

$\Delta X = 0.34 D$

Accordingly, (½)p>$\Delta X$(=0.34D) is set. More preferably, (⅓)P>$\Delta X$(=0.34D) is set.

If a pitch of each of the light valves 45B, 45G and 45R is 40 μm, then a difference between a maximum thickness and a minimum thickness of the wedge shape of the adhesive layer 1c must be limited to about 59 μm or lower (preferably, 39 μm or lower).

If a pixel p of each of the light valves 45B, 45G and 45R is a small pixel pitch of 10 μm, then ¼ of the foregoing value is necessary for the thickness difference of the wedge shape of the adhesive layer 1c. Accordingly, the difference must be set equal to 15 μm or lower (preferably, 10 μm or lower). But this value is larger compared with that in the first example.

Second Embodiment

A projection display apparatus of a second embodiment functions as follows:

First, lights from a light source are polarized and separated by a polarized beam splitter; one polarized light is made incident on, for example, a Phillips color-separation prism to be color-separated into R, G and B lights; these R, G and B lights are made incident on reflection light valves arranged for the respective color lights to be modulated; the lights thereby emitted are made incident on the light exit surface of the prism again for color composing; the lights are made incident on the polarized beam splitter; only the modulated lights are analyzed; and then the analyzed lights are projected by a projection lens. In the system for using the analyzed lights in the polarized beam splitter as lights to be transmitted, the number of polarized beam splitters to be used is one. Accordingly, image deviation of each light valve never occurs in the polarized beam splitter, and a problem of a distorted projected image can be solved.

Figure 4:
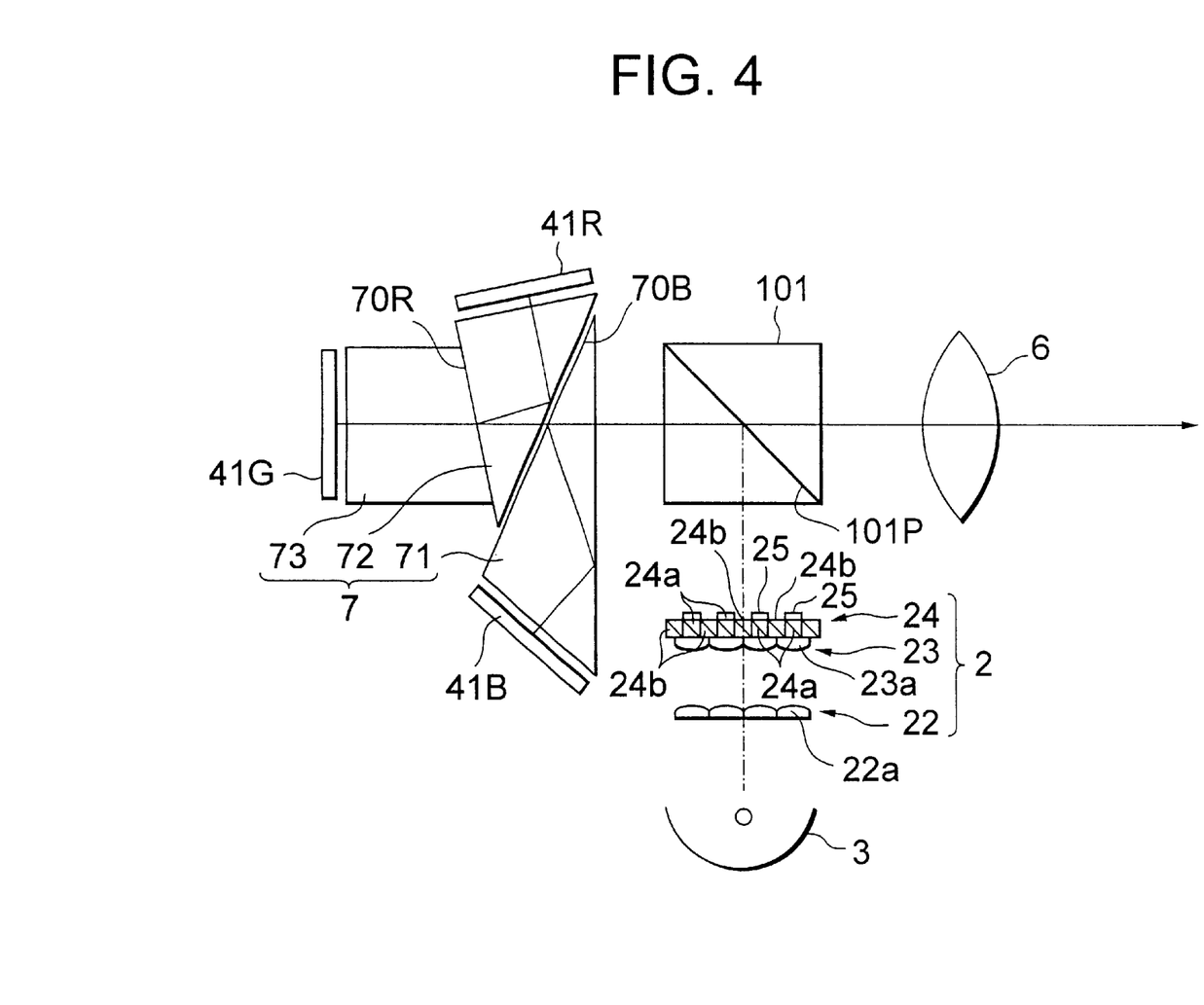
FIG. 4 is a view illustrating a structure of a projection display apparatus of a second embodiment.

Referring to FIG. 4, illustrated is a structure of the projection display apparatus of the second embodiment. Lights emitted from a light source 3 are roughly parallel light beams and randomly polarized. These lights are passed through the same polarization converter 2 as that of the first embodiment so as to be converted into S polarized lights.

The lights converted into S polarized lights by the polarization converter 2 are first made incident on a polarized beam splitter 101. A polarizing and separating section 101P of the polarized beam splitter 101 is arranged in an S direction for reflecting the S polarized lights. Thus, the S polarized lights made incident on the polarized beam splitter 101 are reflected by the polarizing and separating section 101P and then emitted. The lights are then made incident on Phillips prism 7 which constitutes a color-separation and composing optical system.

Phillips prism 7 is composed of first, second and third prisms 71, 72 and 73. A gap is provided between the first and second prisms 71 and 72. A B light reflection dichroic film 70B is formed on a surface of the first prism 71, and an R light reflection dichroic film 70R is formed on a joint surface between the second and third prisms 72 and 73.

A B light component included among white S polarized lights made incident on the first prism 71 of Phillips prism 7 is reflected by the dichroic film 70B to advance through the first prism 71. The B light is subjected to a total reflection by an incident surface of the first prism 71 while advancing through the first prism 71, and advances to exit from the first prism 71. Then, a light valve 41B for B light arranged in the vicinity of a light exit surface of the first prism 71 is illuminated by the S polarized light. A mixed light component of an R light and a G light which advance after being transmitted through the first prism 71 is made incident on the second prism 72 to advance. Then, the mixed light is divided into an R light component and a G light component: the R light being reflected by the R light reflection dichroic film 70R provided on the joint surface between the second and third prisms 72 and 73 to advance, and the G light being directly transmitted to advance into the third prism 73. The former R light advances through the second prism 72, further advances after being totally reflected by a surface abutting the gap with the first prism 71 and exits. Then, a light valve 41R for R light is illuminated. The latter G light directly advances through the third prism 73 to exit from the same. Then, a light valve 41G for G light is illuminated.

The lights of respective colors made incident on the light valves 41R, 41G and 41B for the respective colors are subjected to modulation by color signals inputted thereto. These lights are then reflected/emitted as mixed lights of modulated P polarized lights and unmodualted S polarized lights.

The lights emitted from the light valves 41R, 41G and 41B for the respective lights are moved ahead in opposite directions on the same optical axis as an incident optical axis to enter Phillips prism 7 again. Then, a composed light is emitted from the incident surface of the first prism 71.

The color-composed light emitted from Phillips prism 7 is made incident on the polarized beam splitter 101. Only the modulated light included in this composed light is analyzed as a light to be transmitted by a polarizing and separating section 101P of the polarized beam splitter 101. The unmodulated light is discarded as a reflected light. The analyzed light is made incident on the projection lens 6. Then, a full-color image is projected on a not-shown screen.

The polarized beam splitter 101 now in use serves both as a polarization and separation optical system and a light analyzing optical system. This splitter 101 is manufactured with a precision for satisfying the expression (5) of the first embodiment. As a result, although a projected image may be slightly distorted to be a parallelogram, its distortion does not exceed about ½ of one pixel at the maximum, and thus the image can satisfy a precision necessary for image processing.

Third Embodiment

Figure 5:
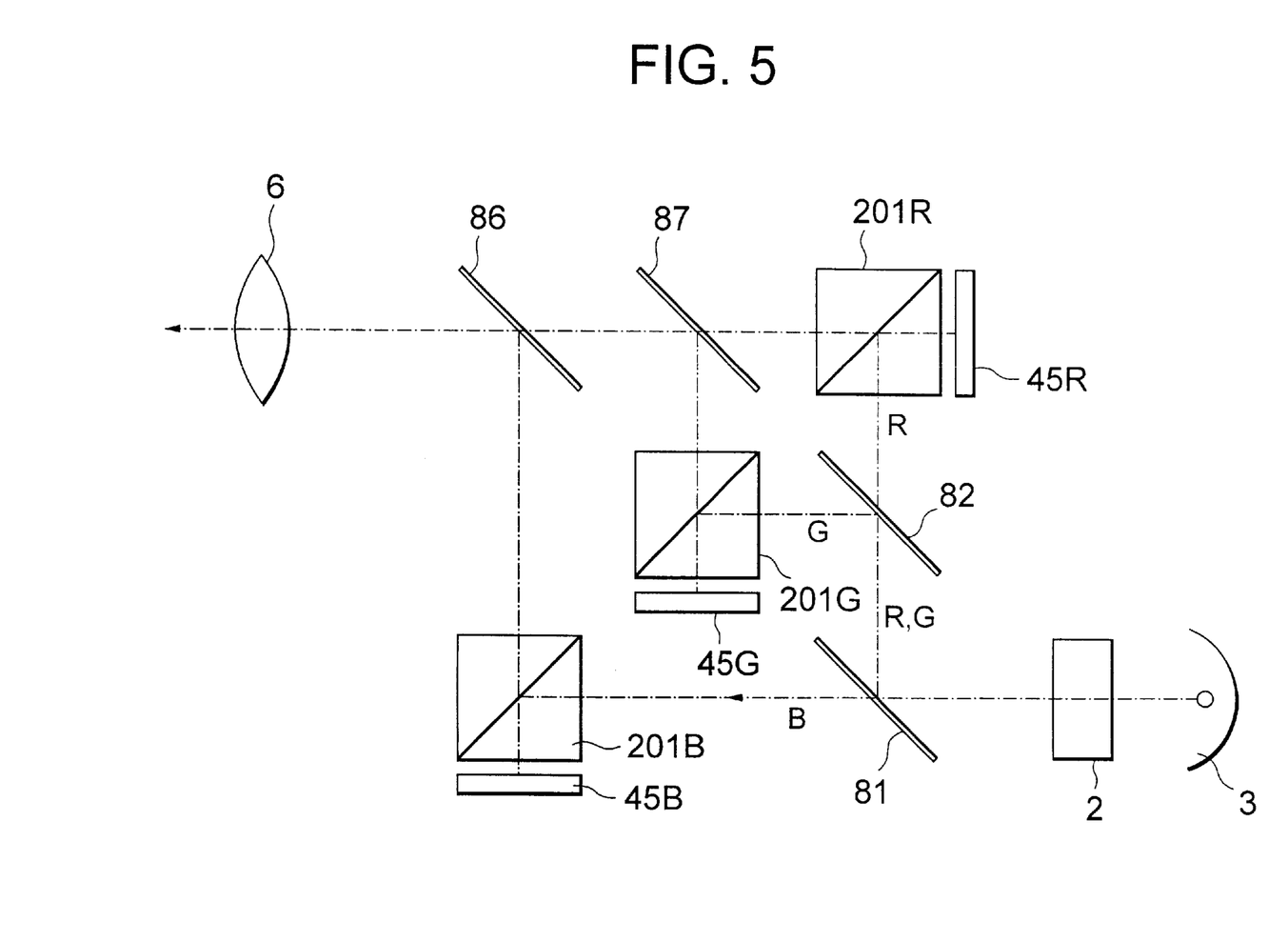
FIG. 5 is a view illustrating a structure of a projection display apparatus of a third embodiment.

FIG. 5 is a view for explaining a structure of a projection display apparatus of a third embodiment. In the apparatus of the third embodiment, rather than analyzing a modulated light from a composed light by using one polarized beam splitter, polarized beam splitters for light analyzing are provided for respective color lights.

Lights emitted from a light source 3 are roughly parallel light beams and random polarized. These lights are passed through the same polarization converter 2 as that of the second embodiment so as to be converted into S polarized lights.

The lights converted into S polarized lights by the polarization converter 2 are made incident on a dichroic mirror 81 arranged on an optical axis for transmitting a B light and reflecting G and R lights, and then color-separated into a transmitted B light and a composite light of reflected G and R lights. The latter composite light of the G and R lights advances in a direction orthogonal to the B light to enter a dichroic mirror 82 having a G light reflection property, which is arranged on the optical axis in parallel with the dichroic mirror 81. Then, the composited light is reflected and color-separated into a G light which advances in an orthogonal direction and an R light which is transmitted to advance straight. As can be understood from the foregoing descriptions, the dichroic mirrors 81 and 82 constitute a color-separation optical system for color-separating a light from the light source into R, G and B lights.

The B, G and R lights obtained by color-separation are made incident on polarized beam splitters 201B, 201G and 201R arranged for the respective color lights. Polarizing and separating sections of the polarized beam splitters 201B, 201G and 201R are arranged in an S direction so as to reflect incident S polarized lights. Incident S polarized lights of the respective colors are respectively reflected by the polarizing and separating sections and then emitted from the polarized beam splitters 201B, 201G and 201R.

The S polarized lights of the respective colors emitted from the polarized beam splitters 201B, 201G and 201R are then made incident on reflection light valves 45B, 45G and 45R arranged in the vicinity of light exit surfaces. The S polarized lights made incident on the light valves 45B, 45G and 45R are subjected to modulation by color signals inputted thereto. Modulated lights by the light valves 45B, 45G and 45R become P polarized lights. These P polarized lights are reflected and emitted together with S polarized light as unmodulated lights, and then made incident from the light exit surfaces in opposite directions on the polarized beam splitters 201B, 201G and 201R again. The modulated P lights included in the lights made incident on the polarized beam splitters 201B, 201G and 201R are transmitted through the respective polarizing and separating sections and analyzed, and then transmitted through the polarized beam splitters and emitted. The B light included in the modulated P polarized lights emitted from the polarized beam splitters 201B, 201G and 201R is made incident on a B light reflection dichroic mirror 86 arranged on an optical axis, reflected by the same and then moved ahead after changing the optical axis by a right angle. The G light is made incident on a G light reflection dichroic mirror 87 arranged on an optical axis in parallel with the dichroic mirror 86, reflected by the same and then moved ahead after changing the optical axis by a right angle. The G light is then made incident on the dichroic mirror 86, transmitted and then composed with the B light. The R light is made incident on the dichroic mirrors 87 and 86, transmitted through these elements to advance, and then color-composed with the G and B lights. As can be understood from the foregoing, the dichroic mirrors 86 and 87 constitute a color composing optical system.

A composed light formed by the color composing optical system which includes the dichroic mirrors 86 and 87 is made incident on a projection lens 6, and a full-color image is projected on a not-shown screen.

Each of the polarized beam splitters 201B, 201G and 201R serves both as a polarization and separation optical system and a light analyzing optical system, and is manufactured with a precision for satisfying the expression (5) described above with reference to the first embodiment. Therefore, although a projected image may be slightly distorted to be a parallelogram, the distortion does not exceed about ½ of one pixel at the maximum, and thus the image can satisfy a precision necessary for image processing.

Fourth Embodiment

Figure 6:
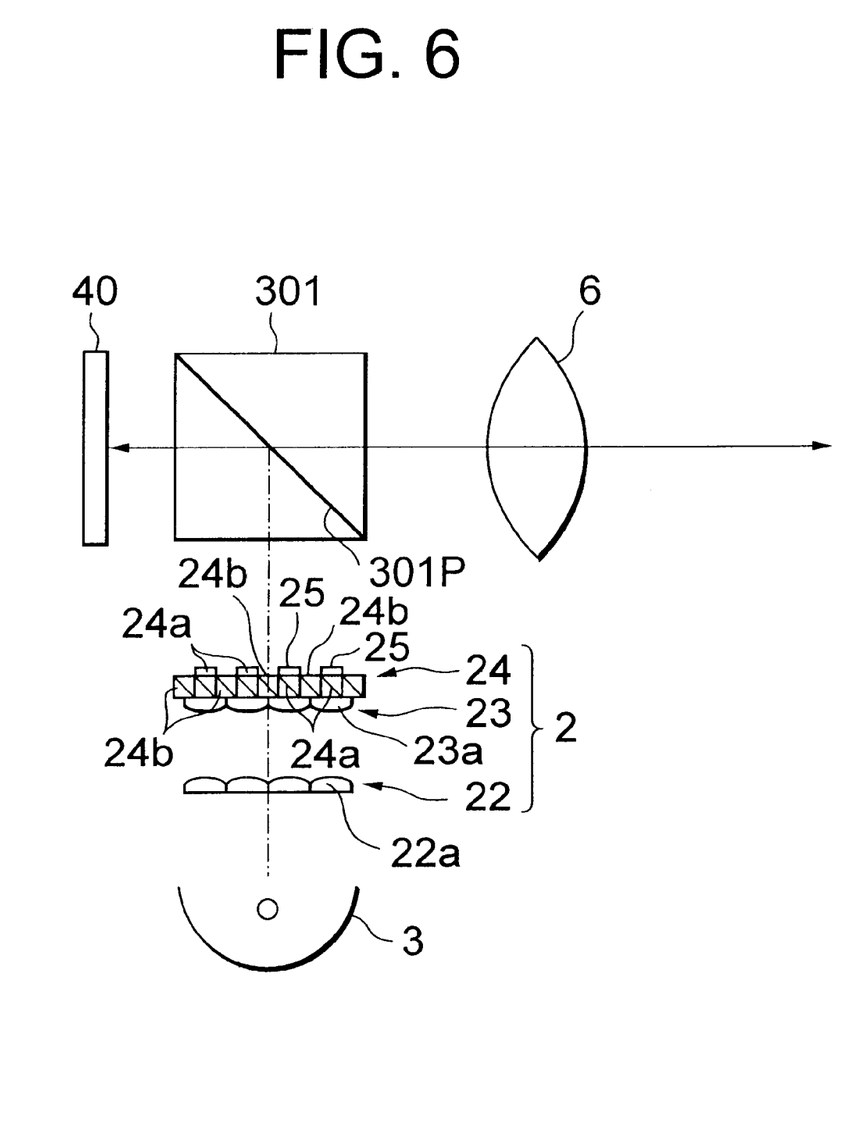
FIG. 6 is a view illustrating a projection display apparatus of a fourth embodiment.

FIG. 6 is a view for explaining a structure of a projection display apparatus of a fourth embodiment. This projection display apparatus comprises: a light source 3 composed of a lamp and a concave mirror; a polarization converter 2 for converting a light from the light source 3 into an S polarized light, which is the same as that of the first embodiment; a polarized beam splitter 301 having a polarizing and separating section 301P; a light valve 40 as a reflection type light modulator arranged on an optical axis in the vicinity of a light exit surface of the polarized beam splitter 301; and a projection lens 6 for projecting a modulated light transmitted through the polarized beam splitter 301 and analyzed on a screen (not shown).

In the projection display apparatus, lights emitted from the light source 3 are parallel light beams and random polarized, and passed through the same polarization converter 2 as that of the second embodiment so as to be converted into S polarized lights.

The S polarized lights formed by the polarization converter 2 are made incident on the polarized beam splitter 301. But since the polarizing and separating section 301P of the polarized beam splitter 301 is arranged so as to reflect S-polarized lights and transmit P-polarized lights, the S polarized lights are reflected by the polarizing and separating section 301P, moved ahead after changing an advancing direction by a right angle, and then emitted from the polarized beam splitter 301. The S polarized lights emitted from the polarized beam splitter 301 and made incident on the light valve 40 are, in a specified region selected by a color signal to the light valve 40, subjected to modulation, and then converted into P polarized lights where a vibrating direction has been changed by 90°. In an unselected region, i.e., in a region not selected by the color signal, the incident S polarized lights are directly reflected/emitted. Specifically, a light emitted from the light valve 40 is a mixed light of a modulated P polarized light and an unmodulated S polarized light. This emitted light is made incident on the polarized beam splitter 301 again, and then polarized and separated by the polarizing and separating section 301P into a modulated P polarized light to be transmitted and an unmodulated S polarized light to be reflected and discarded, in other words analyzed as such. The modulated P polarized light transmitted through the polarized beam splitter 301 and analyzed is made incident on the projection lens 6, and then projected on a screen.

The polarized beam splitter 301 used in the fourth embodiment serves both as a polarization and separation optical system and a light analyzing optical system. This splitter 301 is manufactured with a precision for satisfying the expression (5) described above with reference to the first embodiment. Therefore, although a projected image may be slightly distorted to be a parallelogram, the distortion does not exceed about ½ of one pixel at the maximum, and thus the image can satisfy a precision necessary for image processing.

Although the preferred embodiments of the present invention have been described in detail, it should be understood that various changes, substitutions and alterations can be made therein without departing from spirit and scope of the invention as defined by the appended claims.

What is claimed is:

1. An optical device for a projection display apparatus, comprising:
   an analyzer section to analyze modulated light into predetermined polarized light, said modulated light emitted from a modulator section including two-dimensionally arrayed pixel units for modulating an incident light;
   wherein said analyzer section includes a polarized beam splitter having a pair of prisms and an adhesive layer held between said pair of prisms, and
   a difference in thickness between thinnest and thickest portions of said adhesive layer is greater than zero and does not exceed a predetermined value determined based on a pixel pitch of said modulator section.

2. An optical device for a projection display apparatus according to claim 1, wherein if a refractive index of said pair of prisms is $n_1$, a refractive index of said adhesive layer is $n_2$, a difference in thickness between the thinnest and thickest portions of said adhesive layer is D and said pixel pitch is P, then a value $\Delta X$ determined by a following expression $$\Delta X = D\left(\frac{n_1}{2\cdot\sqrt{n_2^2 - 0.5\cdot n_1^2}} - \frac{1}{\sqrt{2}}\right)$$

satisfies the following relationship:

$$0 < \Delta X < (½)P.$$

3. An optical device for a projection display apparatus according to claim 1, including a polarized light separating device which is constructed to separate the polarized light from light from a light source and to emit the polarized light to the modulator section.

4. An optical device for a projection display apparatus according to claim 3, wherein said polarized beam splitter conjointly has the function of said polarized light separating device.

5. An optical device for a projection display apparatus according to claim 1, wherein said modulator section includes a first color modulator which modulates light of a first color and emits a first color modulated light and a second color modulator which modulates light of a second color and emits a second color modulated light; and said analyzer section is constructed to analyze and color-compose said first color modulated light and said second color modulated light.

6. An optical device for a projection display apparatus according to claim 5, wherein said analyzer section has at least two of said polarized beam splitters, including a first color polarized beam splitter to analyze the first color modulated light and a second color polarized beam splitter to analyze the second color modulated light; and said analyzer section includes a color-composing optical system which color-composes light from the first color polarized beam splitter and light from the second color polarized beam splitter.

7. An optical device for a projection display apparatus according to claim 5, wherein said analyzer section includes a color-composing optical system to color-compose the first color modulated light and the second color modulated light; and said polarized beam splitter analyzes light emitted from said color-composing optical system.

8. A method for constructing an optical device for a projection display apparatus, said method comprising:

providing an analyzer section to analyze modulated light into predetermined polarized light, said modulated light emitted from a modulator section including two-dimensionally arrayed pixel units for modulating an incident light;

wherein said analyzer section includes a polarized beam splitter having a pair of prisms and an adhesive layer held between said pair of prisms, and a difference in thickness between thinnest and thickest portions of said adhesive layer is greater than zero and does not exceed a predetermined value determined based on a pixel pitch of said modulator section.

9. A method according to claim 8, wherein if a refractive index of said pair of prisms is $n_1$, a refractive index of said adhesive layer is $n_2$, a difference in thickness between the thinnest and thickest portions of said adhesive layer is D and said pixel pitch is P, then a value $\Delta X$ determined by a following expression $$\Delta X = D \left( \frac{n_1}{2 \cdot \sqrt{n_2^2 - 0.5 \cdot n_1^2}} - \frac{1}{\sqrt{2}} \right)$$

satisfies the following relationship:

$$0 < \Delta X < (\tfrac{1}{2})P.$$

10. A method according to claim 8, which includes providing a polarized light separating device to separate the polarized light from light from a light source and to emit the polarized light to the modulator section.

11. A method according to claim 10, wherein said polarized beam splitter conjointly has the function of said polarized light separating device.

12. A method according to claim 8, wherein said modulator section includes a first color modulator which modulates light of a first color and emits a first color modulated light and a second color modulator which modulates light of a second color and emits a second color modulated light; and said analyzer section is constructed to analyze and color-compose said first color modulated light and said second color modulated light.

13. A method according to claim 12, wherein said analyzer section has at least two of said polarized beam splitters, including a first color polarized beam splitter which analyzes the first color modulated light and a second color polarized beam splitter which analyzes the second color modulated light; and said analyzer section includes a color-composing optical system which color-composes light from the first color polarized beam splitter and light from the second color polarized beam splitter.

14. A method according to claim 12, wherein said analyzer section includes a color-composing optical system which color-composes the first color modulated light and the second color modulated light; and said polarized beam splitter analyzes light emitted from said color-imposing optical system.

\* \* \* \* \*